US008149254B2

(12) United States Patent
Kim

(10) Patent No.: US 8,149,254 B2
(45) Date of Patent: Apr. 3, 2012

(54) DISPLAYING APPARATUS TO REDUCE IMAGE MARKING AND CONTROL METHOD THEREOF

(75) Inventor: Chang-sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1771 days.

(21) Appl. No.: 11/294,588

(22) Filed: Dec. 6, 2005

(65) Prior Publication Data

US 2006/0125809 A1 Jun. 15, 2006

(30) Foreign Application Priority Data

Dec. 10, 2004 (KR) ........................ 10-2004-0104091

(51) Int. Cl.
*G09G 5/00* (2006.01)
*G09G 5/02* (2006.01)
*G06F 3/038* (2006.01)

(52) U.S. Cl. .......... 345/698; 345/699; 345/3.4; 345/204

(58) Field of Classification Search ................... 345/3.4, 345/204, 698, 699
See application file for complete search history.

(56) References Cited

U.S. PATENT DOCUMENTS 5,844,339 A * 12/1998 Schroeder et al. ........... 310/90.5
6,018,331 A * 1/2000 Ogawa ............................ 345/99
6,107,983 A * 8/2000 Masuda et al. .................. 345/98
6,486,900 B1 * 11/2002 Shen et al. .................... 715/867
2002/0105490 A1 * 8/2002 Kanbe et al. .................... 345/87
2003/0076332 A1 * 4/2003 Choi ............................. 345/581
2004/0051705 A1 * 3/2004 Lee ............................... 345/204
2004/0165064 A1 * 8/2004 Weitbruch et al. ............ 348/173
2005/0246657 A1 * 11/2005 Widner ......................... 715/805

FOREIGN PATENT DOCUMENTS

CN 1484433 3/2004
CN 1537302 10/2004
EP 1271459 1/2003
JP 2003-174601 6/2003
KR 1997-78552 12/1997
KR 2004-19747 3/2004
KR 2004-26057 3/2004

OTHER PUBLICATIONS

Chinese Office Action dated Mar. 7, 2008 issued in CN 2005-10128926.X.
Korean Office Action dated Jul. 27, 2006 issued in KR 2004-104091.

* cited by examiner

*Primary Examiner* — Lin Ye
*Assistant Examiner* — Chia-Wei A Chen
(74) *Attorney, Agent, or Firm* — Stanzione & Kim, LLP

(57) ABSTRACT

The invention relates to a displaying apparatus having a display unit on which an image corresponding to an image signal inputted is displayed, comprising: an image signal processing unit processing the image signal so that the image is displayed on the display unit; and a control unit controlling the image signal processing unit to output a predetermined image on a blank area where the image is not displayed when the blank area is displayed for a predetermined time and to change the predetermined image. Accordingly, an aspect of the present invention to provide a displaying apparatus capable of preventing an image sticking phenomenon by sensing a blank area, outputting a predetermined pattern on the blank area and changing the predetermined pattern periodically when the blank area is continued for a predetermined period of time.

17 Claims, 3 Drawing Sheets

DISPLAYING APPARATUS TO REDUCE IMAGE MARKING AND CONTROL METHOD THEREOF

CROSS-REFERENCE TO RELATED APPLICATIONS

This application claims the benefit of Korean Patent Application No. 2004-0104091, filed on Dec. 10, 2004, which is hereby incorporated by reference for all purposes as if fully set forth herein.

BACKGROUND OF INVENTION

1. Field of Invention

The present invention relates to a displaying apparatus and a control method thereof, and more particularly, a displaying apparatus outputting a predetermined pattern image when a blanking area is displayed for a predetermined time, and a control method thereof.

2. Description of the Related Art

A display apparatus generally includes a display unit having an aspect ratio of 4:3 on which an image is output has a and most image signals input thereto have an aspect ratio of 4:3.

However, due to an increase in multimedia functions, the displaying apparatus receives image signals input from a variety of image sources, and processes and outputs these image signals. One such image sources may have an aspect ratio of 16:9.

There are two ways to process an image signal having an aspect ratio that is not 4:3 and display it on the screen: the size of an image signal may be adjusted to adapt to the screen size of the display apparatus at the aspect ratio of 4:3, or the aspect ratio of the original image may be maintained and output as it is, e.g., output an image signal having an aspect ratio of 4:3 on a screen size adaptive to a 16:9 aspect ratio.

The former method is likely to cause distortion in an image; therefore, the image is generally processed according to of the latter method.

However, because the image and the screen of the display unit do not have the same aspect ratio in the latter method, a certain area of the screen is likely to be a blank area that has no image signal. The blank area may be a solid color or design, such as black or white.

For example, when a movie or image having an aspect ratio of 16:9 is viewed on a displaying apparatus with a screen having an aspect ratio of 4:3, black spaces may be generated on an upper part and a lower part of the screen of the displaying apparatus as the blanking area.

In a general cathode ray tube (CRT), a burning phenomenon occurs when the CRT is turned on in white for a sufficient time. In a liquid crystal display (LCD), an image sticking phenomenon similar to the burning phenomenon may occur when the black image is displayed in the blanking area depending on a mode of the liquid crystal.

SUMMARY OF THE INVENTION

An aspect of the present invention to provide a displaying apparatus capable of preventing an image sticking phenomenon by sensing a blank area, outputting a predetermined pattern on the blank area and changing the predetermined pattern periodically when the blank area is continued for a predetermined period of time.

Additional aspects and/or advantages of the present invention will be set forth in part in the description which follows and, in part, will be obvious from the description, or may be learned by practice of the present invention.

The foregoing and/or other aspects and advantages of the present invention are achieved by providing a displaying apparatus having a display unit on which an image corresponding to an image signal inputted is displayed, comprising: an image signal processing unit processing the image signal so that the image is displayed on the display unit; and a control unit controlling the image signal processing unit to output a predetermined image on a blank area where the image is not displayed when the blank area is displayed for a predetermined time and to change the predetermined image.

According to an aspect of the present invention, the image signal processing unit comprises a scaler and an on-screen display processing unit, and wherein the control unit comprises a microcomputer allowing the on-screen display processing unit to generate the predetermined image.

According to an aspect of the present invention, the blank area comprises: an area in a top region of a display screen and an area in a bottom region of a display screen where the image is not displayed.

According to an aspect of the present invention, the predetermined image comprises a black image.

According to an aspect of the present invention, the control unit changes the predetermined image periodically in at least one of a color, and/or a brightness, and/or a contrast.

According to an aspect of the present invention, the control unit changes the predetermined image periodically in at least one of a color, and/or a brightness, and/or a contrast.

According to an aspect of the present invention, the control unit toggles the predetermined image at a predetermined period of white and black pixels.

According to an aspect of the present invention, the control unit toggles the predetermined image at a predetermined period of white and black pixels.

According to an aspect of the present invention, the predetermined image is a patterned image.

The foregoing and/or other aspects and advantages of the present invention are achieved by providing a method of controlling a displaying apparatus having a display unit on which an image corresponding to an image signal inputted from an image source is displayed, comprising: sensing a blank area where the image is not displayed; outputting a predetermined image on the blank area when the blank area is continued for a predetermined time; and changing the predetermined image when the predetermined image is displayed for the predetermined time.

According to an aspect of the present invention, the predetermined image comprises a black image.

According to an aspect of the present invention, changing the predetermined pattern image comprises changing at least one of a color, and/or a brightness, and/or a contrast of the image.

According to an aspect of the present invention, the predetermined image is a patterned image.

According to an aspect of the present invention, the predetermined image toggles at a predetermined period of white and black pixels.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Figure 1:
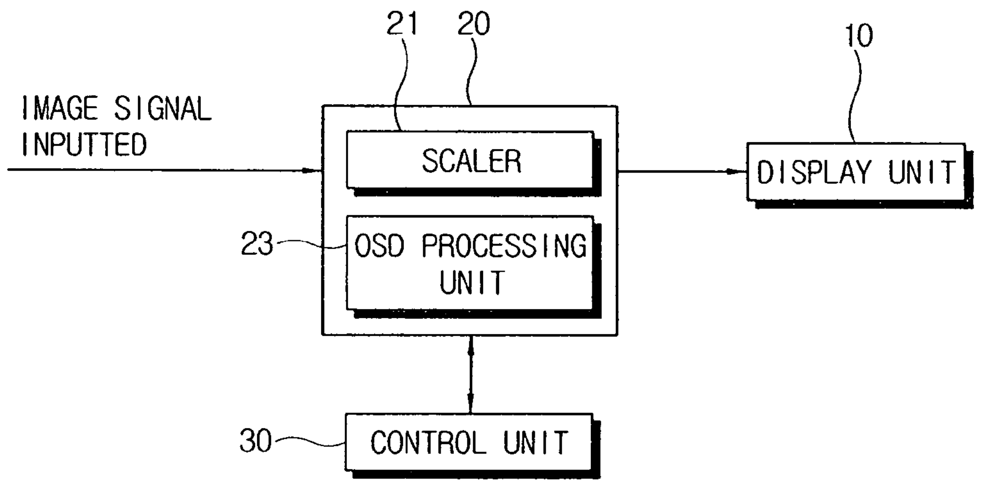
FIG. 1 is a control block diagram to explain an liquid crystal display monitor according to an embodiment of the invention.

Reference will now be made in detail to the embodiments of the present invention, examples of which are illustrated in the accompanying drawings, wherein like reference numerals refer to like elements throughout.

In a non-limiting example, the present invention uses a liquid crystal display (LCD) monitor as a display apparatus. It is understood that the invention is not limited to the LCD monitor, other flat panel display devices may be employed, such as a PDP.

FIG. 1 is a control block diagram of an LCD monitor according to an embodiment of the invention.

Returning to FIG. 1, an LCD monitor includes an image signal processing unit 20 processing an image signal inputted from an image source into a format capable of being displayed by a display unit 10, a display unit 10 displaying the processed image signal on a screen of the LCD monitor, and a control unit 30 controlling the image signal processing unit and the display unit and interactions therebetween.

The display unit 10 may be made with an LCD panel to display the image signal processed by the image signal processing unit 20 on the screen. For example, the LCD panel supplies each pixel with voltage corresponding to a signal supplied from the image signal processing unit 20 and displays the image on the screen. The display unit 10 and the image signal processing unit 20 may be interconnected through low voltage differential signaling (LVDS) between them.

The image signal processing unit 21 may include a scaler 21 and an on screen display (OSD) processing unit 23.

The scaler 21 may adaptively convert an inputted image signal adaptively to a vertical frequency, a resolution, and a screen ratio to meet particular display standards of the display unit 10.

The OSD processing unit 23 generates an OSD image capable of being displayed on the display unit 10 and outputs such image.

The control unit 30 controls the LCD monitor and may be realized with a micro control unit (MCU).

When an image signal is input from an image source, the control unit 30 controls the image signal processing unit 20 to process an image signal that meets or corresponds with the display standard of the display unit 10 and the processed image signal is subsequently displayed on the display unit 10.

The control unit 30 controls the image signal processing unit to adjust the size of a screen while the scaler 21 is processing an image signal, such that the screen size may be adjusted while a 16:9 aspect ratio of the image signal is maintained.

For example, when an image source is a moving image, the control unit 30 allows the scaler 21 to adjust the screen size while maintaining a 16:9 aspect ratio of the image signal of the movie.

When the screen size is adjusted, a certain area on the upper part and the lower part of the screen where the image is not displayed is processed as a blanking area where the image is not displayed. Noise may be created in the blanking area.

When the blanking area continues for a predetermined time, the control unit 30 applies a control signal so that a predetermined pattern image is output on the blank area in order to prevent burning.

The OSD processing unit 23 generates and outputs the predetermined pattern image according to a command from the control unit 30.

For example, the predetermined pattern image may be a black image or a pattern image with a different color.

When a predetermined period of time passes, the control unit 30 controls the OSD processing unit 23 to change color or brightness of the predetermined pattern image.

The control unit 30 may change color, brightness, contrast, etc. of the predetermined pattern image, which results in changing the pattern image by dithering or altering a part of the black image.

Accordingly, an image sticking or image burning phenomenon may be prevented by periodically changing the pattern image.

The above described process is described in more detail below with reference to FIG. 2.

Figure 2:
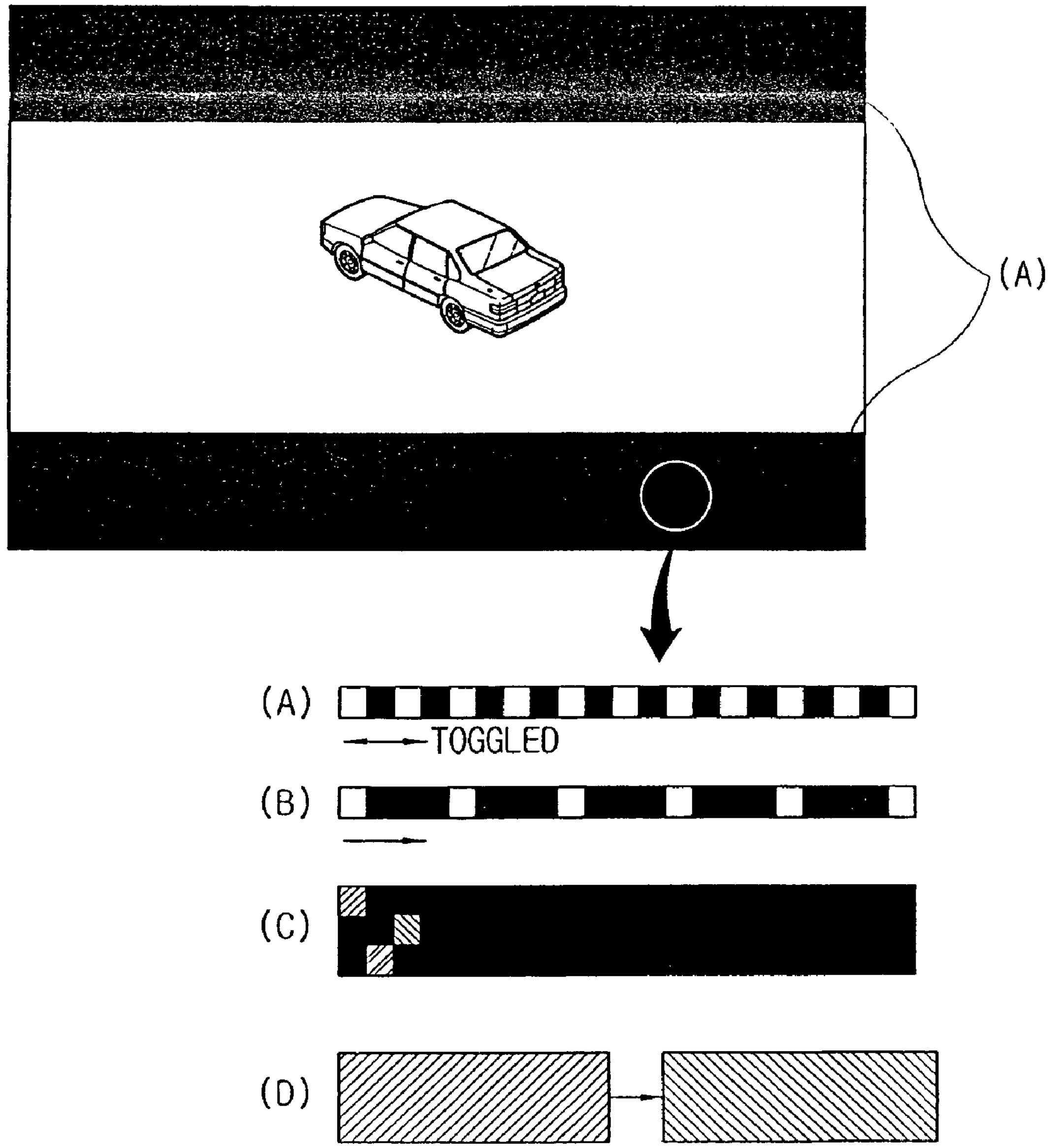
FIG. 2 shows a picture displayed on a display unit of the liquid crystal display monitor according to an embodiment of the invention.

FIG. 2 illustrates an image displayed on a display unit of the LCD monitor according to an embodiment of the invention. For purposes of convenience, duplicate descriptions relating to FIG. 1 are omitted as necessary.

As illustrated, when a moving image with an aspect ratio of 16:9 is viewed through an LCD monitor with an aspect ratio of 4:3, (A) areas in the upper regions and the lower regions of the display screen are processed as blanking sections.

The control unit 30 controls the display apparatus so that a predetermined pattern image having a predetermined period is output on the blanking section.

For example, the predetermined pattern image may be a black image or may be realized variously with different colors.

Some examples of changes in the pattern image when a predetermined period of time passes to output the predetermined pattern image are described with reference to (A-1) to (A-4) of FIG. 2.

For example, as shown in (A-1) of FIG. 2, the pattern image may be changed so that white pixels and black pixels form a ratio of approximately 1:1 and may be toggled at a predetermined period or an arbitrary time.

For example, as shown in (A-2) of FIG. 2, the pattern image may be changed so that white pixels and black pixels from a ratio of approximately 1:3 and the white color moves sideways, e.g., to the right, at a predetermined period or an arbitrary time.

For example, as shown in (A-3) of FIG. 2, the pattern image may be changed so that black pixels form the majority of the patterned image, and arbitrary pixels among them have brightness cell by cell relative to various R, G, and B pixels at the predetermined period or an arbitrary time and are moved to an arbitrary $n^{th}$ pixel.

For example, as shown in (A-4) of FIG. 2, a color of the pattern image may be changed at a predetermined period or an arbitrary time.

It should be noted that FIG. 2 illustrates one example of a pattern image and the pattern may be changed and realized in various manners. In color representation, the number of pixels representing white may be less or the time representing white may be shortened and the time representing black may be lengthened, the pattern image may generally be represented in a black color or a gray color close to black, such that it may be difficult for a user to perceive any change in color.

The control unit 30 may change a black image to a different pattern in consideration of the time that the image is displayed to prevent image sticking.

The control unit 30 may also control so that the pattern image, such as the image illustrated in FIG. 2, is only output for a predetermined period of time before a black image is again output.

Thus, for a first predetermined period of time, the predetermined pattern image displayed on the blanking section appears generally black, however this pattern image may include white pixels. In addition, various patterns, such as the patterns shown in (A-1) through (A-4) of FIG. 2 may be displayed from when the blanking section first appears.

Figure 3:
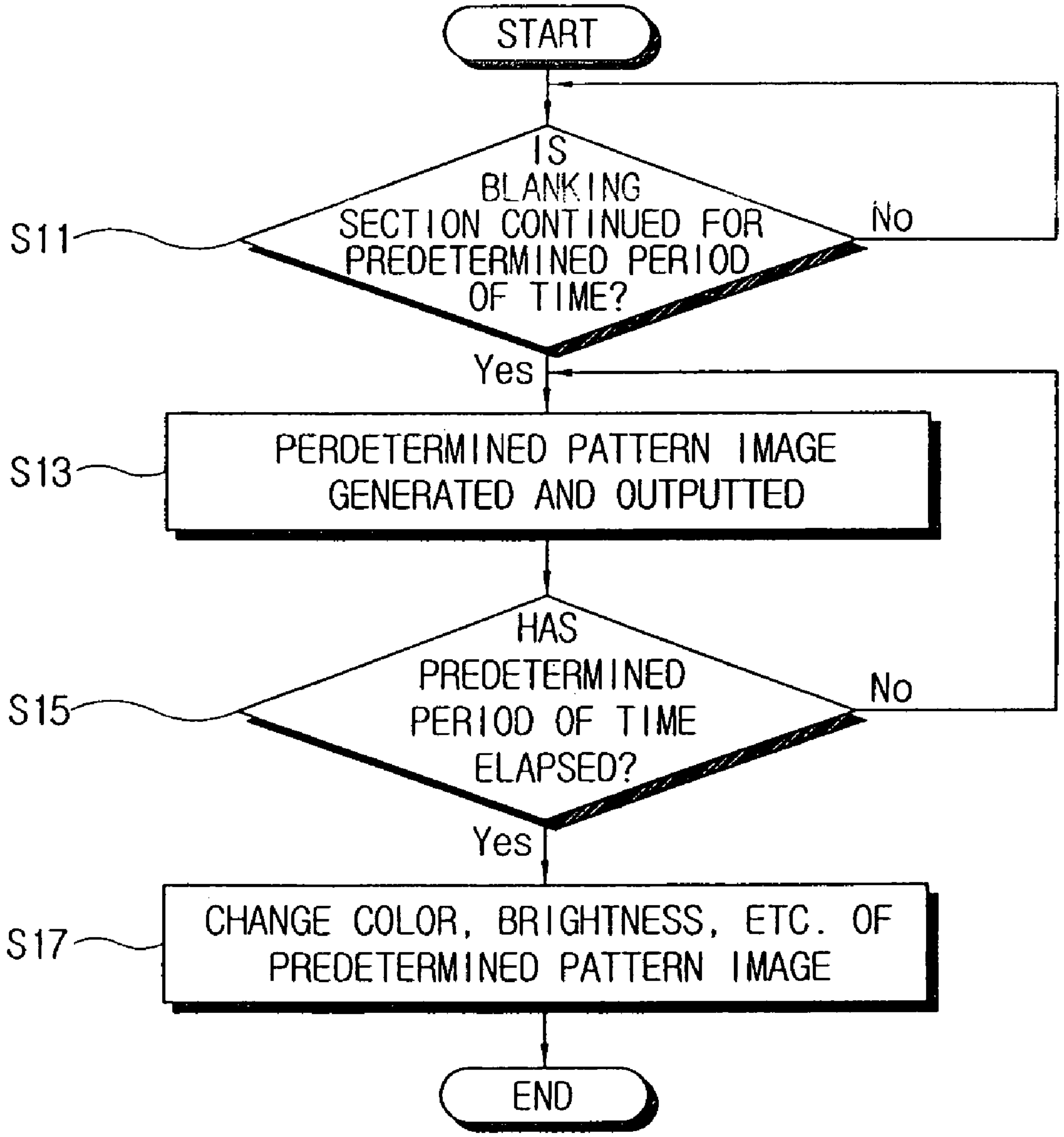
FIG. 3 is a control flow chart of the liquid crystal display monitor according to an embodiment of the invention.

A control flow of the LCD monitor according to an embodiment of the invention is described with reference to FIG. 3. For purposes of convenience, duplicate description thereby are omitted as necessary.

For example, when an aspect ratio of an image signal input from an image source is 16:9, the scaler 21 adjusts the image size to correspond with the aspect ratio of the image signal. At this time, a blanking area is generated.

Where the blanking area is continued for the predetermined period of time determined at operation S11, the control unit 30 senses the blanking area and the display time of the blanking area with respect to the predetermined time, controls the OSD processing unit 23 to generate the predetermined pattern image and outputs the generated pattern image to the display unit 10 so that the generated pattern image is output on the blanking section at operation S13.

For example, the predetermined pattern image generated at this time may be a black image.

When the time during which the predetermined pattern image is output elapses the predetermined period of time at operation S15, the control unit 30 changes the pattern image at operation S17 by, for example, changing color, brightness, and/or contrast of the predetermined pattern image at operation S17.

As described above, the changed pattern image may be, for example, any one of the images of A-1, A-2, A-3, and A-4 shown in FIG. 2.

The above described embodiments of the invention are described with reference to a LCD panel, however, it is understood that the present invention may also be applied to other types of displaying apparatuses that generate image sticking or other similar phenomena, for example, a digital light processing (DLP), a plasma display panel (PDP), an organic light emitting diode (OLED), etc.

As described above, according to embodiments of the invention, there is provided a displaying apparatus capable of preventing an image sticking phenomenon by sensing a blanking area, outputting a predetermined pattern on the blanking area and changing the predetermined pattern periodically when the blanking section is continued for the predetermined period of time, and a control method thereof.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A displaying apparatus having a display unit on which an image corresponding to an image signal inputted is displayed, comprising:

an image signal processing unit processing the image signal so that the image is displayed on the display unit; and a control unit controlling the image signal processing unit to output a predetermined image having a plurality of white and black pixels on a blank area where the image is not displayed when the blank area is displayed for a predetermined time and to change the predetermined image periodically, wherein the control unit toggles the white and black pixels with respect to each other at a predetermined period.

2. The apparatus of claim 1, wherein the image signal processing unit comprises a scaler and an on-screen display processing unit, and wherein the control unit comprises a microcomputer allowing the on-screen display processing unit to generate the predetermined image.

3. The apparatus of claim 1, wherein the blank area comprises:

an area in a top region of a display screen and an area in a bottom region of a display screen where the image is not displayed.

4. The apparatus of claim 1, wherein the predetermined image comprises a black image.

5. The apparatus of claim 4, wherein the control unit changes the predetermined image periodically in at least one of a color, and/or a brightness, and/or a contrast.

6. The apparatus of claim 4, wherein the control unit toggles the predetermined image at a predetermined period of white and black pixels.

7. The apparatus of claim 1, wherein the control unit changes the predetermined image periodically in at least one of a color, and/or a brightness, and/or a contrast.

8. The apparatus of claim 1, wherein the predetermined image is a patterned image.

9. A method of controlling a displaying apparatus having a display unit on which an image corresponding to an image signal inputted from an image source is displayed, comprising:

sensing a blank area where the image is not displayed;

outputting a predetermined image having a plurality of white and black pixels on the blank area when the blank area is continued for a predetermined time; and changing the predetermined image periodically by toggling the white and black pixels with respect to each other at a predetermined period when the predetermined image is displayed for the predetermined time.

10. The method of claim 9, wherein the predetermined image comprises a black image.

11. The method of claim 9, wherein changing the predetermined image periodically comprises changing at least one of a color, and/or a brightness, and/or a contrast of the image.

12. The method of claim 9, wherein the predetermined image is a patterned image.

13. A displaying apparatus including a display unit having an active area on which an active image is displayed and at least one blank area where the active image is not displayed, comprising:

an image signal processing unit to process an image signal corresponding to the active image on the active area; and a control unit to control the image signal processing unit to fill the at least one blank area with a plurality of images including black and white pixels and to change the position of each image periodically among the plurality of images after a first predetermined time period and to toggle the white and black pixels with respect to each other at a second predetermined period.

14. The displaying apparatus of claim 13 wherein the plurality of images includes a first group of images and a second group of images and wherein a position of the first group of images is changed after a first changing time period and a position of the second group of images is changed after a second changing time period.

15. The displaying apparatus of claim 13 wherein the control unit changes the position of each image in the at least one blank area while the active image is displayed in the active area.

16. The displaying apparatus of claim 13 wherein the blank area is filled with the plurality of images after a filling time period occurs.

17. A method of controlling a display apparatus including a display unit having an active area on which an active image corresponding to an image signal inputted is displayed and at least one blank area where the active image is not displayed, comprising:

processing an image signal corresponding to the active image on the active area;

filling the at least one blank area with a plurality of images including black and white pixels; and changing the position of each image periodically among the plurality of images after a first predetermined time period and toggling the white and black pixels with respect to each other at a second predetermined time period.

* * * * *